United States Patent [19]

Degn et al.

[11] 4,370,844
[45] Feb. 1, 1983

[54] PACKAGING APPARATUS

[75] Inventors: Kaj Degn, Hasselager; Ejvind Waldstrøm, Hundslund, both of Denmark

[73] Assignee: O. G. Høyer A/S, Hojbjerg, Denmark

[21] Appl. No.: 186,468

[22] Filed: Sep. 12, 1980

[51] Int. Cl.³ .............................................. B65B 9/06
[52] U.S. Cl. ...................................... 53/546; 53/550; 53/202; 53/251
[58] Field of Search ............... 53/202, 244, 251, 546, 53/534, 550; 198/449, 450

[56] References Cited

U.S. PATENT DOCUMENTS

| | | | |
|---|---|---|---|
| 2,670,887 | 3/1954 | Landgraber | 53/202 X |
| 2,971,305 | 2/1961 | Webster | 53/246 X |
| 3,045,405 | 7/1962 | Anderson | 53/244 X |
| 3,948,018 | 4/1976 | Rowekamp | 53/202 X |

*Primary Examiner*—John Sipos
*Attorney, Agent, or Firm*—Cyrus S. Hapgood

[57] ABSTRACT

From a row of objects which are conveyed on an intermittently movable feeding conveyor, every second object is deposited on lines of wrapping materials at a first station, which lines are advanced continuously under the feeding conveyor, and the remaining objects are deposited on the same lines of wrapping materials at a following station. In connection with one or both depositing steps, the objects are shifted transversely of the direction in which said lines are advanced. Thus, the number of lines of wrapping material is only half the number of objects in each row, whereas the distance between the lines will be increased so much that the lines may be sealed lengthwise and crosswise by means of rotating sealing means. Two objects deposited one after the other on the same line at different stations are brought into exact position for the crosswise sealing by means of a pair of plates which are moved forwards and backwards over the lines in a cycle and which, during the forward movement, shift the objects forward on the line, the plates during their backward movement being lifted to clear the objects lying to the rear of the respective plates. The transverse sealing may be effected by means of a pair of rotating sealing blocks which are spring loaded individually.

6 Claims, 9 Drawing Figures

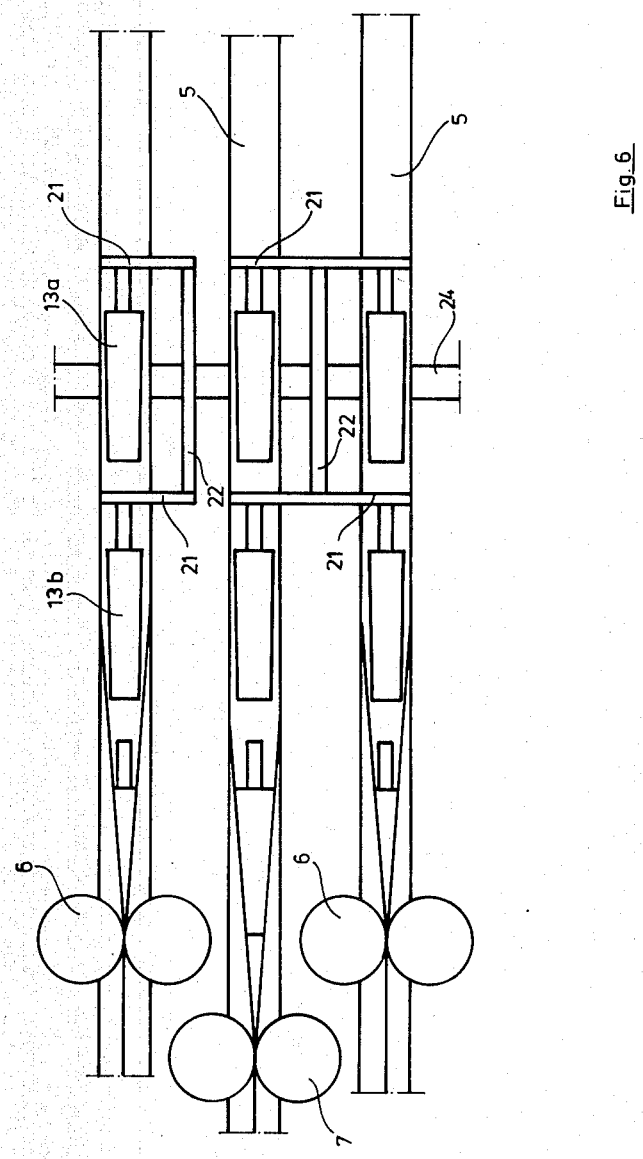

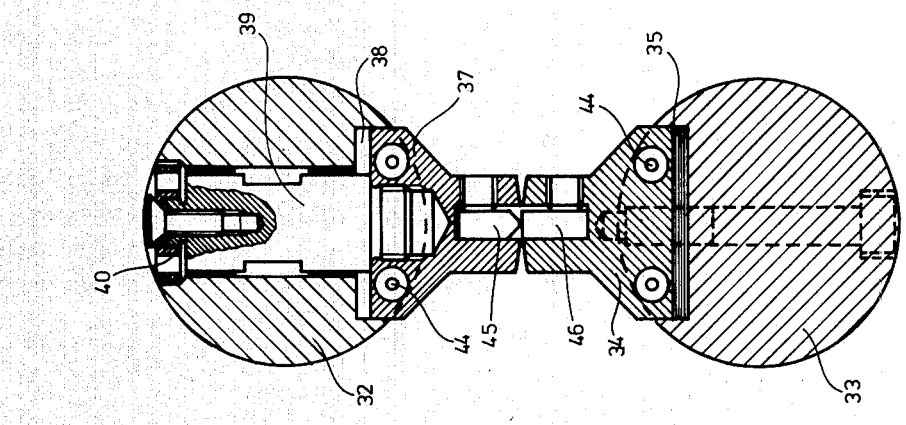
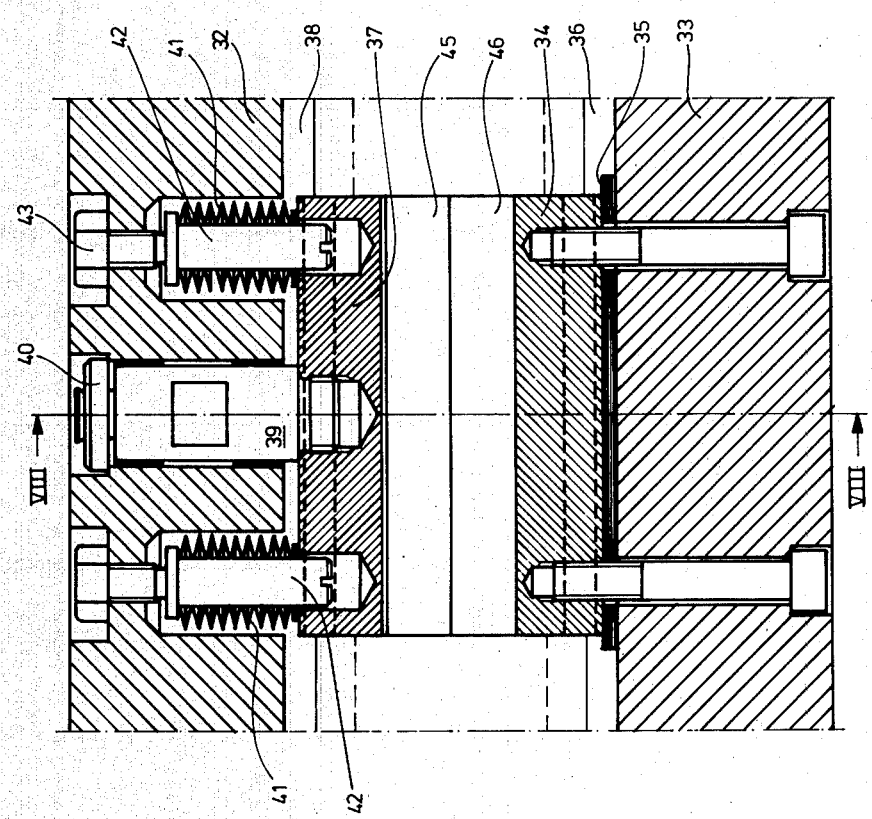

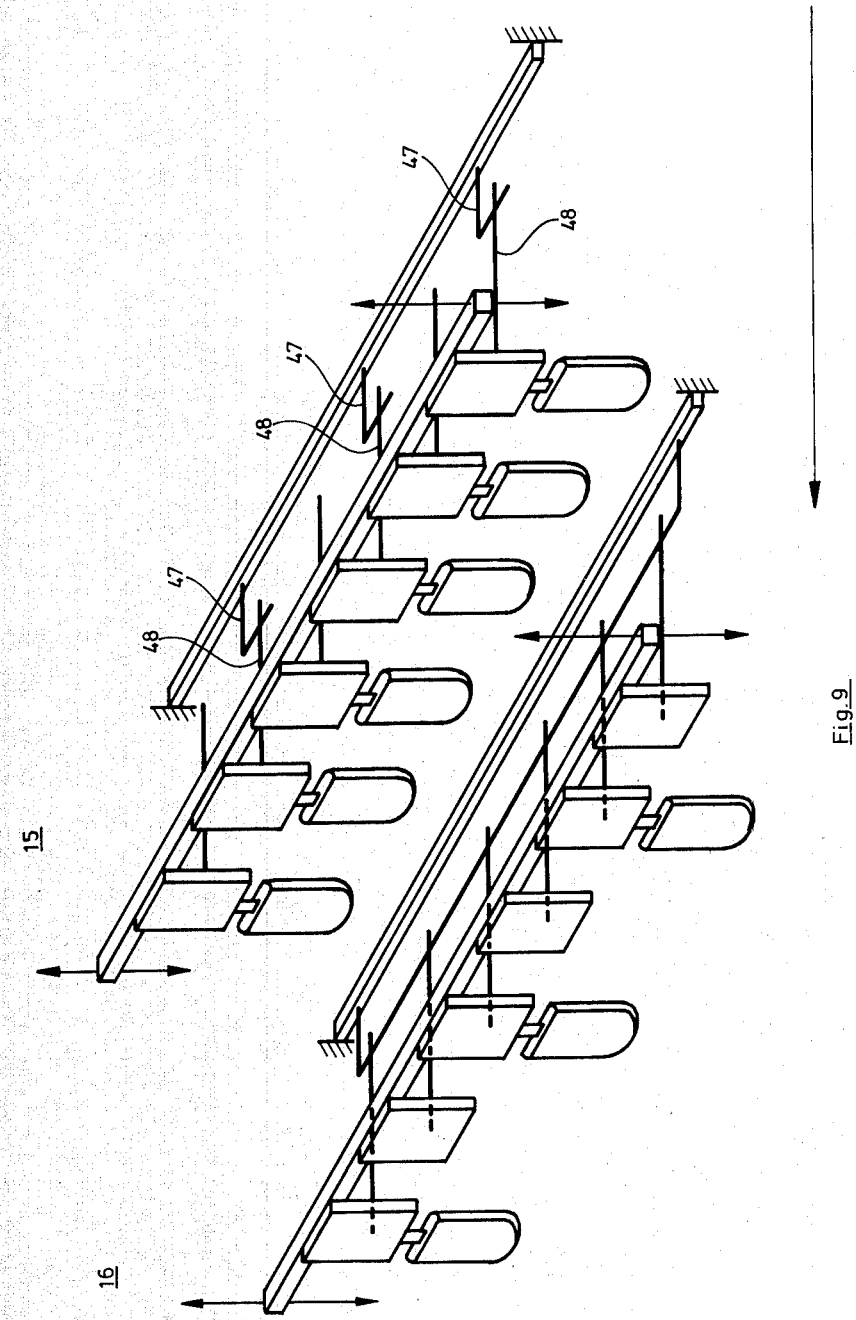

PACKAGING APPARATUS

The present invention relates to the packaging of ice cream bars and other objects, wherein the objects are conveyed in rows from a production machine and deposited on a number of lines of wrapping material carried forward side-by-side, these lines being folded about the object, sealed together lengthwise and crossways and divided into separate packages.

Usually when carrying out this so-called multi-lane technique, the number of lines of wrapping material conveyed in parallel is the same as the number of objects in each row. The simultaneous depositing of a whole row of objects on the parallel lines has some advantages over the so-called single lane technique, where a row of objects is deposited simultaneously on an intermediate conveyor, from which the objects are transported one after the other to a single line of wrapping material. The rate of wrapping is lower as a consequence of the parallel-conveyed lines, which increases the operational security of the apparatus and gives better conditions for heat sealing of the wrapping material. When the objects can be deposited directly from the production machine, an intermediate conveyor may be eliminated so that the problems connected therewith are avoided, such as hygienic problems when wrapping food-stuffs.

However, this usual multi-lane technique has considerable disadvantages. When the lines of wrapping material are conveyed forward with the same spacing between lines as the objects on the feeding conveyor, there is no place between the lines for sealing rolls for sealing the packages lengthwise. The sealing must instead be accomplished by means of stationary sealing blocks, which increases the demands upon the wrapping material and also often gives an unsatisfactory tightness. It is also necessary to fold the lines to half their width before they are conveyed to the wrapping machine, which makes it impossible to use the usual cold sealing materials, as this material may stick to itself when folded.

The shoft distance between the parallel lines also creates a risk that the ends of two bags lying close to each other after the transverse sealing may be placed over each other, which makes later separation of the bags troublesome, as when they are conveyed to a carton. For cross-sealing and cutting, plane cross-sealing elements and cutting elements are used, and this means that the lines must be conveyed forward intermittently, which may lead to varying tensions on the line and also make it difficult to use plastic material. Objects with a smooth surface, such as so-called water ice, may slide on the wrapping material during the intermittent conveying forward and thereby become located in the wrong place for the cross-sealing.

With the aim of avoiding the above-mentioned disadvantages, the method of the present invention is characterized partly in that each row of objects is deposited in two successive operations, the first acting to deposit alternate objects in the row and the second acting to deposit the remaining objects in the row. Moreover, in connection with each second depositing step, there is performed such a displacement of the hitherto undeposited objects that two objects which initially were side-by-side in a row are deposited on the same line.

This halving of the number of lines of wrapping material gives a corresponding larger distance between two adjacent lines and thus makes it possible to use rotating pressure elements for sealing the lines lengthwise and crossways. As a result, a more efficient sealing is obtained; and as the lines may be used without a previous folding, even cold sealing wrapping material may be used. The lines of wrapping material may be conveyed forward continuously at an even rate; and as the conveying rate is lower than when using the single lane wrapping, a high operational security and a longer time are obtained for effecting the sealing of the wrapping material. After the cutting, the separate packages are free from each other, even if their widths are increased in the cross sealing zone due to the flat pressing.

In certain applications, for example when ice-cream bars are conveyed from a freezer by means of a rotating gripping arm, it may be necessary to release all ice-cream bars in a row simultaneously. In that case, alternate ice-cream bars are deposited in respective pockets which, after depositing of the other ice-cream bars on the lines of wrapping material, are shifted laterally of the lines and thereafter opened for depositing the rest of the ice-cream bars. Where possible, it is preferred that the two steps of depositing ice-cream bars be effected at separate positions along the line, as the hygienic problems of cleaning the pockets are thereby avoided.

In the preferred practice of the invention, each line of wrapping material underlies the space between two adjacent objects in a row moving along the lines, and the row is shifted endwise (laterally of the lines) in one direction for the first depositing step and in the opposite direction for the second depositing step. In this way, the necessary shifting of the objects in connection with each depositing step is reduced to a quarter of the spacing between the lines.

In one preferable way of carrying out the invention, the objects are deposited simultaneously in both positions, and each pair of simultaneously deposited objects is pushed forwards on the line of wrapping material to a mutual distance which is equal to the length of the bag. This makes it possible to fix the length of the bag only in relation to the length of the object, without being bound to the operational length of the feeding conveyor, which therefore can be kept constant even when the length of the objects varies.

The invention also relates to an apparatus for carrying out the method and comprises a feeding conveyor with gripping means arranged in rows for the objects, driving means for conveying the lines of wrapping material forward in parallel under the feeding conveyor, means for releasing the gripping means, and means for folding each line around the objects, for sealing the line to form a tube, for sealing the tube crossways and for cutting the tube at the transverse sealings. The apparatus is characterized in that the number of means for carrying the lines forward is half of the number of gripping means in each row, in that in a first station there are means for releasing each second gripping means in a row and in another station ahead of the first-mentioned station there are means for releasing the rest of the gripping means, and in that there are means in at least the first station for displacing the objects released in this station, before they are deposited on their respective lines of wrapping material.

When each set of means for carrying the lines forward according to the invention underlies the space between two neighboring gripping means, and there are means for displacing the objects in both stations, the necessary displacement of the objects will be only half of the initial distance between the objects, which is of advantage when the gripping means are lowered for the depositing in order to reduce the falling height of the objects, and where the gripping means therefore also follow the movement sideways.

When the gripping means are arranged on crossing rods which are advanced intermittently by means of the feeding conveyor, and when the depositing takes place by releasing the rod from the conveyor and lowering the rod, before the gripping means are released, the means for obtaining a shifting of the objects towards the side comprise slanting guides for the mainly vertical movement of the rod.

The forward movement of the objects on the lines of wrapping material, after which they are brought in the exact position for the cross-sealing, may be obtained in the following way. In connection with each set of means for conveying the lines and at the depositing station, there are two firmly interconnected plates whose spacing from each other in the direction of the line corresponds to the desired length of bags. Driving means connected with the cross-sealing means are arranged to move the plates cyclically forward and backward in the direction of the wrapping material, with a cycle time which is the double of the time between two successive cross-sealings. The part of the movement forward takes place at a higher rate than the rate of the line and closely over the respective lines, while the plates during the backward movement are lifted above the objects lying on the lines.

As mentioned above, the relatively large distance between the separate lines of wrapping material makes it possible to carry out the lengthwise sealing of the lines continuously by means of conventional rotating elements, especially pressure rolls with vertical axes, and these rolls may to advantage be displaced in relation to each other in the direction of the lines. In this way, the space between two neighboring lines may be used for pressure rolls with the largest possible diameter.

The continuous carrying forward of the lines of wrapping material, which in contrast to the known multi-lane technique is made possible by the invention, also makes it possible to seal the packages crossways by means of rotating sealing means. These means may comprise spring loaded sealing blocks which work together in pairs, which means are arranged on common crossing axes over and under the lines of wrapping material and with individually adjustable springs for each pair of sealing blocks. The connecting together of the sealing means of the separate lines by means of the common axes simplifies the construction of the means and of their driving mechanism. The individually adjustable springs makes it possible to accomplish a uniform sealing pressure on all lines, irrespective of the bending out of the axes under influence of the sealing pressure.

The invention is described in more detail in the following with reference to the accompanying drawings, in which FIG. 1 is a schematic plan view of one form of apparatus according to the invention used in connection with a rotating ice-cream bar freezer;

FIG. 6 is a view similar to FIG. 1 but on a larger scale and showing the plates and means for sealing the wrapping lines lengthwise;

FIG. 7 is an enlarged sectional view of one of the rotating means for sealing the packages crossways, and FIG. 8 is a sectional view along line VIII—VIII in FIG. 7, and FIG. 9 is a schematic view of the means for releasing every second gripping means.

Figure 1:
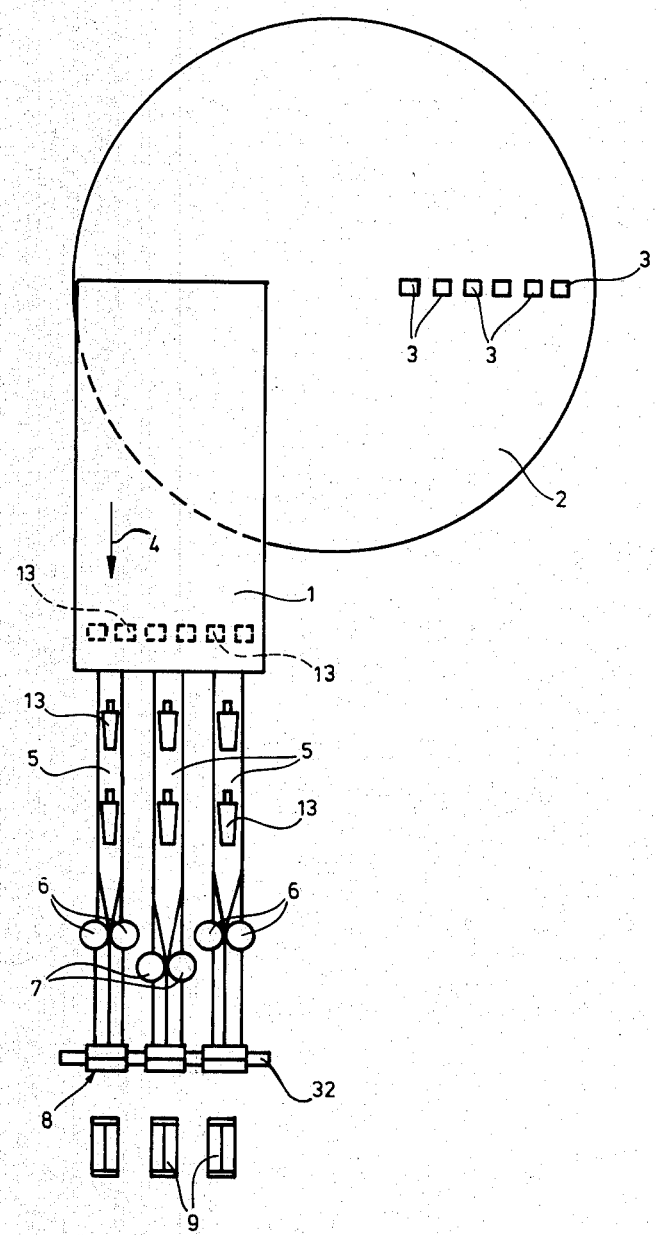
Figure 2:
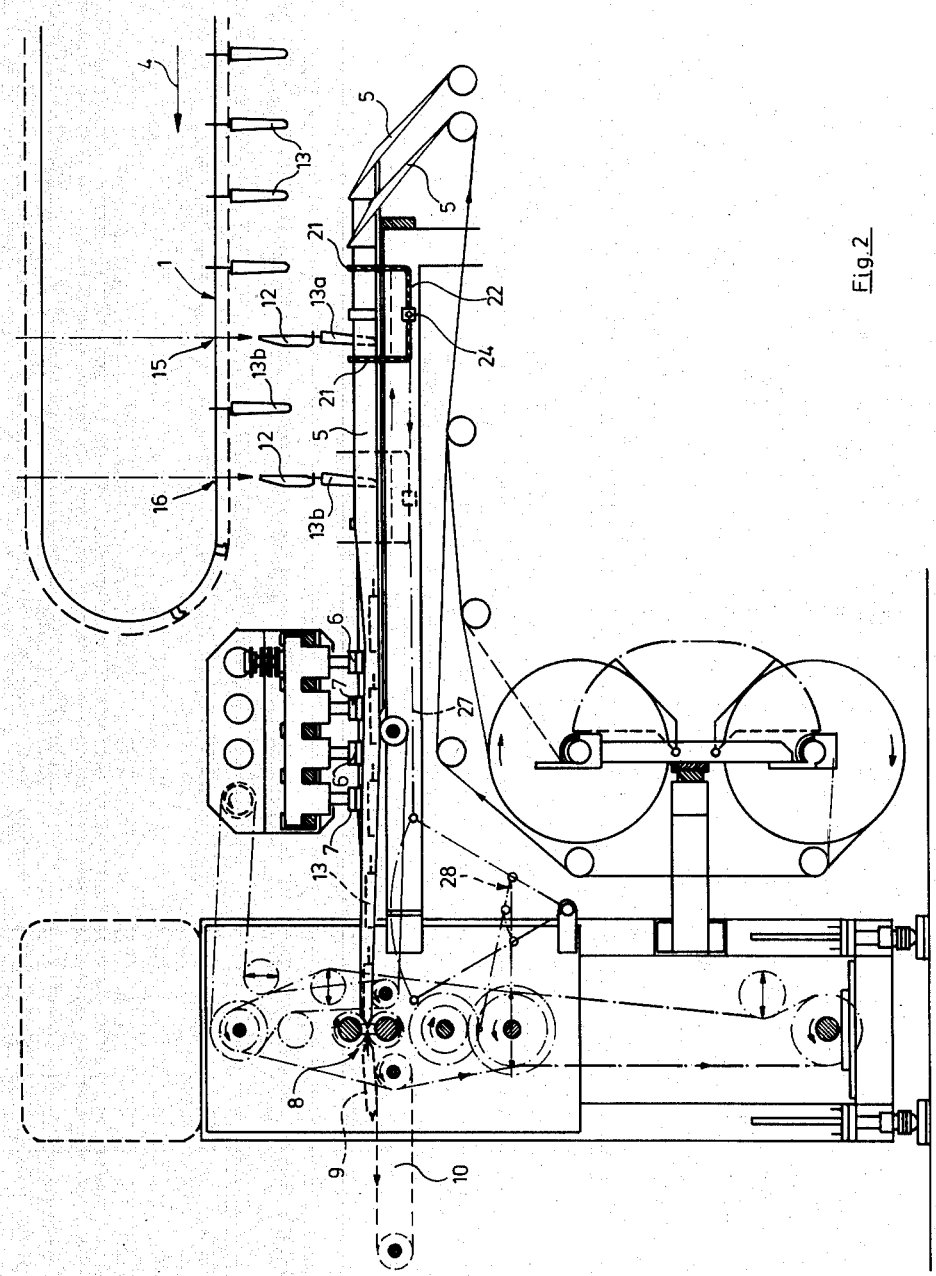
FIG. 2 is a schematic side elevational view of the apparatus on a larger scale.

The illustrated apparatus comprises a conventional feeding conveyor 1 leading from a rotating ice-cream bar freezer 2 having freezing moulds 3 arranged in radial rows and in six concentric rings. Conveyor 1 receives a radial row of six ice-cream bars simultaneously from the freezing moulds and with an intermittent rectilinear movement, shown by arrow 4, carries the ice-cream bars forward and deposits them on three lines 5 of wrapping material. The lines 5 are carried forward continuously under the conveyor 1 in the direction of the arrow 4 from supply rolls shown in part at 5a in FIG. 2 by means of pressure rolls 6. When the ice-cream bars have been deposited on the lines 5 of wrapping material, the wrapping material is sealed into tubes by means of pressure rolls 6 and 7 working together in pairs, and the tubes are then sealed crossways and cut in the cross-sealings by means of rotating sealing and cutting means 8. The packages 9 formed thereby are separated from the apparatus by means of the conveyor 10 shown in FIG. 2. It is noted that FIG. 1 shows only a single pair of sealing rolls for sealing each wrapping line lengthwise, while FIG. 2 shows a modification provided with two pair of rollers for each line. The latter arrangement is of particular importance if the wrapping material is a thermoplast or a composite material comprising a thermoplast, in which case one pair of sealing rolls should be heated.

Figure 3:
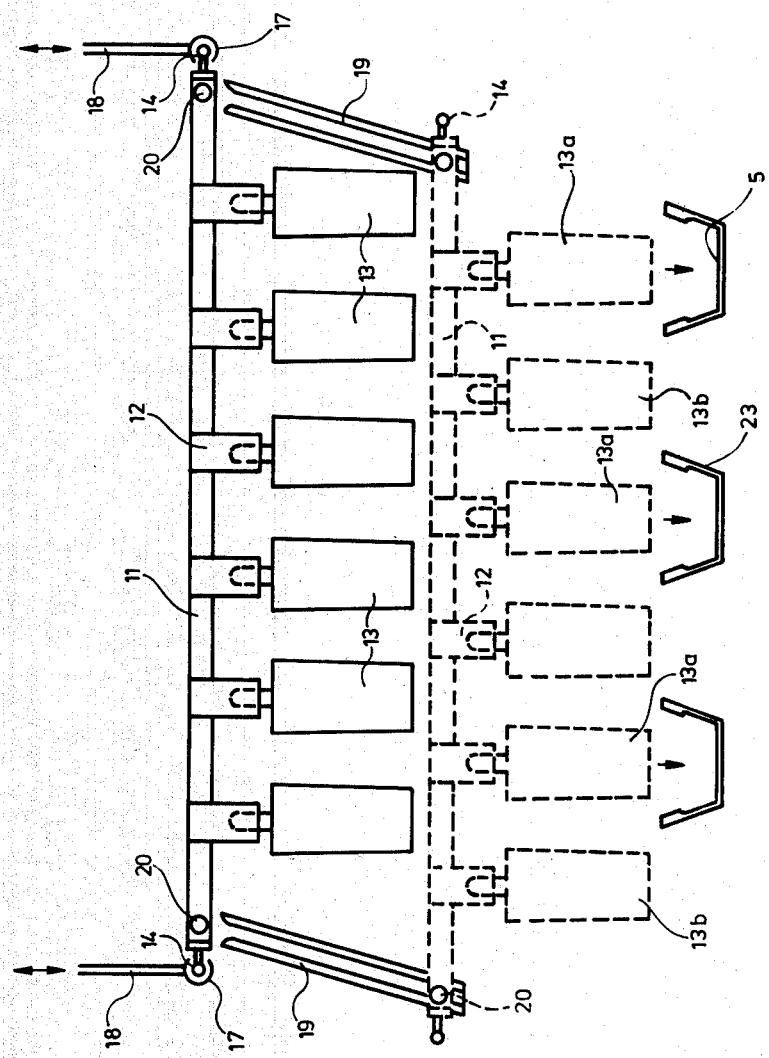
FIG. 3 is a cross-sectional view of the apparatus in FIG. 2, showing the first depositing station of the apparatus on a larger scale.

The feeding conveyor 1 comprises two parallel chains (not shown) having drivers for a row of rods 11 extending transversely of the conveyor and the lines 5 (FIG. 3). The drivers which are U-shaped force the rods forward on rails (not shown) situated under the chains. Each rod 11 carries six gripping means 12 for the ice-cream bars 13. The gripping means, which are known per se, comprise spring loaded jaws which grip the stick of the ice-cream bar and lift the bar from the freezing mould. At its ends, each rod 11 has taps 14 which, along the largest part of the length of the conveyor, engage with stationary guiding means (not shown). At the station where the ice-cream bars are taken up from the freezer 2 and at the two stations 15–16 which are to be described later, these stationary guiding means are interrupted by movable bearers 17 which are carried by rods 18 and which by means of a suitable mechanism (not shown) can be lowered and raised while the conveyor 1 is not moving. Corresponding movable bearers 17 may also be arranged at a station where the ice-cream bars are provided with another layer before depositing them.

In the first depositing station 15, there are two slanting guides 19 which, when cooperating with transverse taps 20 on a rod 11, achieves a displacement to the side of the rod and of the ice-cream bars 13 hanging from the same, when the rod is lowered towards the lines of wrapping material 5. When the rod has been lowered to the position shown with a dotted line in FIG. 3, each second gripping means 12 is released so that the ice-cream bars 13a held by them fall down upon respective lines 5 of wrapping material. The release (known per se) takes place in that a stationary rod engages with an arm on the gripping means which is to be released. When the arm is moved upward the jaws release the ice-cream bar. In FIG. 9 it is shown how the stationary rods 47 engage with every second arm 48. The gripping means with the rest of the ice-cream bars 13b is lifted again to cooperate with the driver of conveyor 1, which forces the means forward to the second depositing station 16. This station has two slanting guides corresponding to the guides 19 but with an inclination opposite to the guides mentioned above. When the rod is lowered in the station 16 and the gripping means 12 are released, each ice-cream bar 13b will be deposited upon the same line of wrapping material 5 as a neighboring ice-cream bar 13a.

As mentioned above, the distance between the two depositing stations 15 and 16, which is determined by the spacing between successive rods 11 of the conveyor 1, is preferably larger than the length of the formed package 9 and thus also larger than the distance to be provided between two successive ice-cream bars 13b and 13a in order to close the packages correctly. In order to achieve the correct distance between the ice-cream bars following each other and simultaneously force them into the exact position for the sealing crossways, the apparatus has for each line of wrapping 5 two interconnected plates 21 which are moved forwards and backwards over the line 5 concurrently with the cross-sealing means 8 by means of a mechanism described below.

Figure 4:
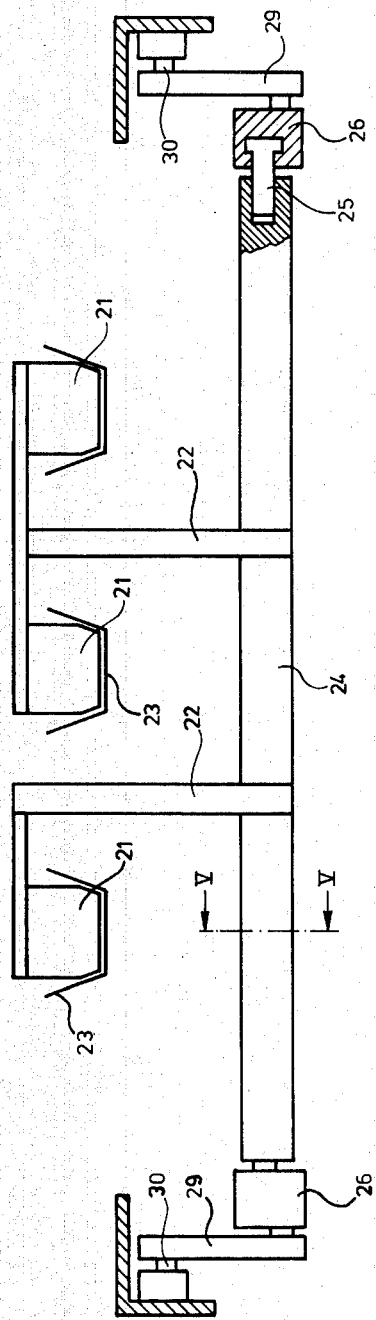
FIG. 4 is a schematic cross-sectional view showing the guiding means for forming the lines of wrapping material into U-shape and one set of the plates which are used to force the ice-cream bars into exact position for sealing of the packages.

All six plates 21 are connected to a travelling crane 24 by means of carrying arms 22 which extend between the separate guiding means 23 for the lines of wrapping material (FIG. 4). The crane 24 is connected at its ends to two gliding blocks 25 which are movable backwards and forwards in two guides 26 in parallel with the line 5. Through a connecting rod 27 (FIGS. 2 and 5), the crane 24 is connected to crank mechanism 28 which is driven concurrently with the rotating sealing means 8 and which achieves a double stroke for each two rotations of the sealing means.

Figure 5:
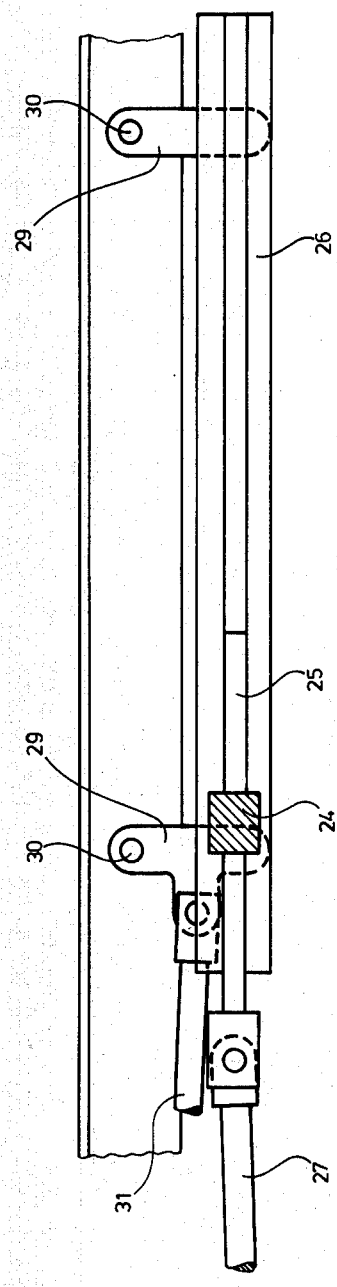
FIG. 5 is a sectional view along line V—V in FIG. 4.

Each guide 26 is pivotally suspended by two links 29 which are pivotally suspended from rigid taps 30 in the frame of the apparatus (FIGS. 4 and 5). A fluid cylinder (not shown) has a piston rod 31 connected to one of the links 29 so that the latter may be moved in the arc of a circle around the respective taps 30 (FIG. 5), whereby the guides 26 and the crane 24 with the plates 21 may be lifted or lowered in relation to the lines 5.

The piston rod 31 is driven in synchronism with crank mechanism 28 so that the guides 26 take their lowest position when the plates 21 are moved to the left in FIG. 2. When this movement is stopped, the guides 26 and the plates 21 are lifted and remain lifted during the movement backwards (to the right in FIG. 2), after which they are lowered again. The forward movement of the plates takes place at an average rate which is higher than the rate of advance of line 5, whereby each plate during one moment of the forward movement engages the end of the ice-cream bar in front; and before the rate of the plates is lowered again to a value lower than the rate of the line, the two ice-cream bars lying one behind the other are forced into the correct spacing on the line and in the exact position for the cross-sealing. As a consequence of the lifting of the plates during their backward movement, the ice-cream bar 13a lying at the rear of each plate may pass freely under the lifted plate.

In FIGS. 7 and 8, cross-sealing and cutting means are shown for a separate line of wrapping material. Two shafts 32 and 33, rotating in parallel and synchronously in opposite directions are journalled in the frame of the apparatus over and under, respectively, the line of wrapping material which is sealed lengthwise by the rolls 6. A lower sealing block 34 and an insulating partition 35 are secured to the bottom of a groove 36 in the shaft 33. The block 34 cooperates with an upper sealing block 37 countersunk in a groove 38 in the shaft 32. A supporting tap 39, supported in a transverse drilling in the shaft 32, is screwed at one end into the block 37; and at its other end the tap carries an adjustable stopping collar 40 which, when abutting against a shoulder in the transverse drilling, limits movement of the block 37 in the direction against the rigid block 34. The fit between the side surfaces of the block 37 and groove 38 prevents the block from rotating about tap 39.

Two stacks of plate springs 41 are arranged to engage the back side of the block 37, and each stack surrounds an adjustable screw 42 which, due to its engagement with the shaft 32, makes possible an individual adjustment of the influence of the separate stack of springs on the block 37. For locking of each adjustable screw 42, there is a lock nut 43. It may be seen that this construction allows an individual adjustment of the sealing pressure which each set of locks 34, 37 exerts on a tube of wrapping material passing between the blocks.

For transverse sealing of the heat sealable wrapping material, there are heating elements 44 in each block. The packages formed during the transverse sealing are separated from each other by means of a knife 45 arranged in the upper block 37 and an element 46 in the lower block.

It should be observed that the invention could just as well be realized by dividing each row of objects 13 into three equal groups, for example, whereby the necessary number of lines of wrapping material will be a third of the number of objects in each row. From a practical point of view, a dividing of each row of objects into two groups will be sufficient in order to achieve the desired advantages. The invention can also be used in connection with an ice-cream bar freezer with linear movement of the freezing moulds through the freezer instead of a circular movement. The invention can also be used for multi-lane packing of other objects, such as separate bits or portions of cakes, small cakes, and chocolate.

As shown in FIG. 2, the spacing between successive rows of ice-cream bars 13 on conveyor 1 is one-half the distance between the depositing stations 15 and 16. Thus, each time conveyor 1 completes a movement of the rows through this one-half distance, it is stopped for simultaneous depositing of bars at stations 15 and 16, whereupon each pair of interconnected plates 21 is moved through its previously mentioned cycle (i.e., forward from station 15 to station 16 and then back to station 15).

We claim:

1. In an apparatus for wrapping objects in bags, the combination of a feeding conveyor including gripping means for holding and conveying said objects in successive rows each extending transversely of the conveying direction, driving means for advancing lines of wrapping material in substantially parallel spaced relation to each other and in said conveying direction below said conveyor, said gripping means being releasable to deposit the objects upon said lines, means adjacent said lines for folding each line around the objects thereon and sealing the folded line longitudinally into a tube, means for sealing the tube crosswise between successive objects on the line and for cutting the line at each said crosswise sealing, the number of said lines which can be advanced by said driving means being one-half the number of gripping means in each said row, longitudinally spaced first and second stations where objects are deposited upon said lines from the feeding conveyor, means for releasing every second gripping means in a said row at said first depositing station, means for releasing the remaining gripping means in said last-mentioned row at said second depositing station, and means located at at least one of said depositing stations for displacing a row of gripping means transversely of said lines in preparation for depositing of objects, said displacing means being operable to cause each said line to receive from each row a pair of objects which were adjacent each other when approaching said first station.

2. The combination of claim 1, in which said driving means are operable to advance each said line in underlying relation to a space between two adjacent gripping means in a said row, in which dispolacing means are located at both of said stations and are operable to displace a said row transversely of said lines in opposite directions, respectively.

3. The combination of claim 2, in which the feeding conveyor also includes rods each supporting a row of said gripping means, the conveyor being operable to advance the rods intermittently to said stations, the conveyor also including means for lowering each rod at each said station prior to release of gripping means at said station, said displacing means including slanting guide means at each station operable on a rod during lowering thereof to shift the rod transversely of said lines, said guide means slanting in opposite directions at the respective stations and thereby acting to shift the rod in opposite directions, respectively.

4. The combination of claim 1, comprising also a pair of interconnected front and rear plates movable along each said line and having a spacing from each other, in the direction of their movement, equal to the desired length of a said bag, said crosswise sealing means including driving mechanism for effecting crosswise sealings intermittently, cycling means driven by said mechanism for moving each pair of plates through a cycle forward from the first to the second station, with a deposited object on the line between the plates, and then backward to the first station, said cycle having a duration time which is double the elapsed time between successive crosswise sealings, each plate pair during part of its forward movement being movable by the cycling means at a forward speed which is greater than the advancing speed of the corresponding line, whereby the rear plate engages said object between the plates at the same time as the front plate engages an object ahead of it, and means for lifting each plate pair to clear objects on the line during said backward movement of the plates.

5. The combination of claim 1, in which said folding and longitudinal sealing means include a pair of pressure rolls for each said line, the rolls for one line being displaced from the rolls of an adjacent line in the direction of the lines.

6. The combination of claim 1, in which said crosswise sealing means for each line includes a pair of coacting rotary sealing blocks, one located above and the other below said line, said blocks being mounted for rotation about respective axes which extend transversely of said line and which are common to the rotation axes of the blocks for the other lines, and individually adjustable springs acting on one block of each pair for spring-loading the pair of blocks.

* * * * *